Oct. 18, 1932.  K. M. RONAN  1,882,673
TUBE END CONNECTION
Filed Sept. 13, 1930
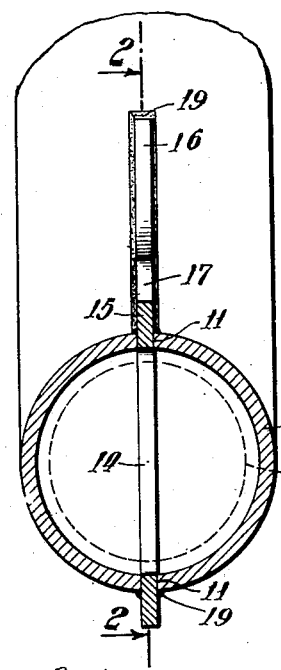
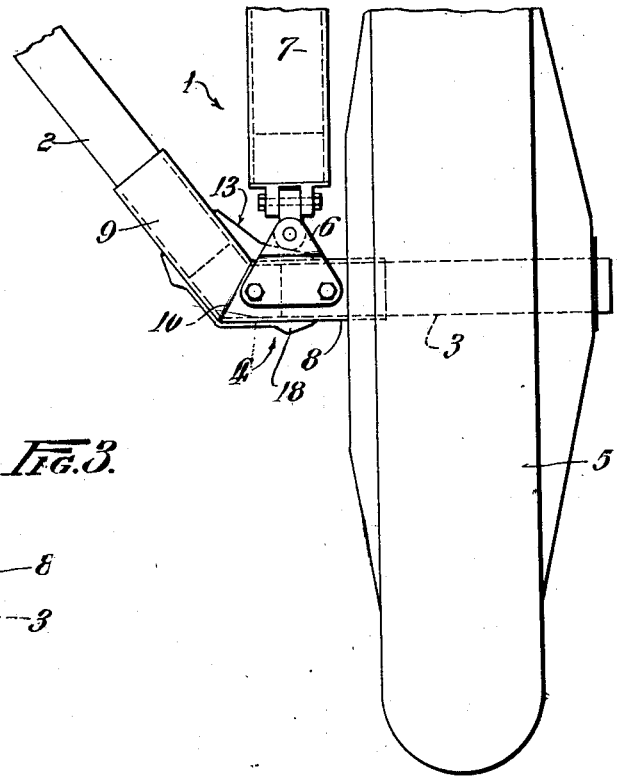
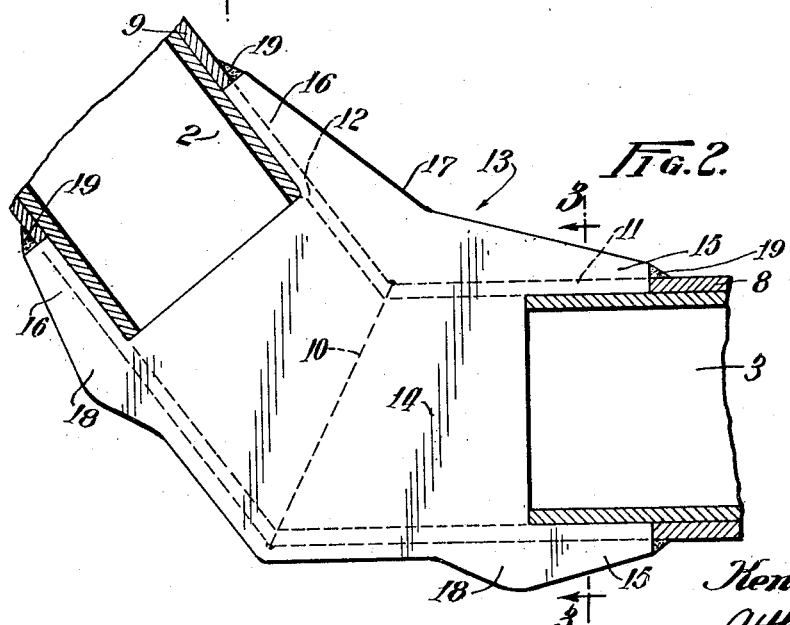
Inventor:
Kenneth M. Ronan, Patented Oct. 18, 1932

1,882,673

UNITED STATES PATENT OFFICE

KENNETH M. RONAN, OF WAYNE, MICHIGAN, ASSIGNOR TO MANNING & CO., OF CHICAGO, ILLINOIS, A CORPORATION OF ILLINOIS

TUBE END CONNECTION

Application filed September 13, 1930. Serial No. 481,636.

This invention relates to improvements in tube end connections and it consists of the matters hereinafter described and more particularly pointed out in the appended claims.

The primary object of the invention is to provide an improved end to end connection between two coacting tubes, which connection is not only simple to produce but is extremely strong and rigid and amply resists any strains tending to bend or twist the same.

Another object of the invention is to provide a connection of this kind wherein the two tube ends are provided with a plurality of longitudinally extending slots which are aligned to receive a bridge or gusset plate having portions engaged and welded in said slots.

These objects of the invention as well as others, together with the many advantages thereof will more fully appear as I proceed with my specification.

In the drawing:—

Fig. 1 is a view in front elevation of a part of the landing gear of an airplane including a strut and axle tube connected together in accordance with one embodiment of my invention.

Fig. 2 is a longitudinal vertical sectional view through the same on an enlarged scale as taken on the line 2—2 of Fig. 3.

Fig. 3 is a transverse vertical sectional view through the same as taken on the line 3—3 of Fig. 2.

In general my invention contemplates the provision of coacting tubes having their ends formed for abutting engagement. In the end of each tube are longitudinally extending slots, the slots in one tube end lining up with those in the other and in said tube ends is provided a member having portions engaged and welded in the aligned slots of both tube ends.

Referring now in detail to that embodiment of the invention, illustrated in the drawing, 1 indicates as a whole a portion of the landing gear of an airplane which includes an axle tube strut 2 and an axle tube spindle 3 connected together by a tubular elbow 4. On the spindle 3 is mounted one of the landing wheels 5. Connected to the elbow 4 is a bracket or fitting 6 with which is operatively engaged the bottom end of an oleo strut or hydraulic leg 7.

The elbow 4 comprises a horizontally disposed tube 8 and a second tube 9 disposed at an angle thereto, the extremities of both tubes being cut at the proper angle to abut with a good weldable end to end engagement as at 10. In the end of the tube 8 are provided longitudinally extending diametrically opposite slots 11 and in the end of the tube 9 are similar slots 12, the slots in one tube end aligning with those in the other tube end. Preferably these slots are disposed in the plane of the greatest strain imposed upon the connection in actual use which in this instance is a perpendicular one.

13 indicates a flat bridge or gusset plate of a length equal to the length of the aligned slots in said tube ends and preferably of a depth or width greater than the diameter of said tubes. As shown herein said plate includes a central body portion 14 having top and bottom end extensions 15—15 and 16—16 respectively, spaced apart a distance approximating the inner diameter of said tubes 8 and 9. Said plate is of a thickness approximating the width of the slots 11 and 12 in said tube ends and when said plate is in place, said extensions completely fill and close said slots. Between the top extension 15 and 16 outside the tubes 8 and 9 is a web 17 to increase the resistance to a compression strain and on each bottom extension is an enlargement 18 to increase the resistance to an expansion strain. When the plate is in the position described, those portions thereof exposed on the outside of the tube are welded in place on both sides as at 19 and the ends of the spindle 3 and strut 2 engage against the ends of the body as best shown in Fig. 3.

When in use in an airplane landing gear as described, the strain imposed upon the elbow fitting is in the plane of the oleo strut and of course, the bridge or gusset plate is disposed in said plane. By reason of the extensions being engaged and welded to the tube parts as described a connection is provided which though strong and rigid, is light in weight and may be easily produced.

While in describing the invention, I have referred in detail to the form and arrangement of the parts, the same is to be considered merely as illustrative so that I do not wish to be limited thereto except as may be specifically set forth in the appended claims.

I claim as my invention:—

1. A connection of the kind described embodying therein coacting tubes abutting and welded in end to end engagement and having a plurality of longitudinally extending aligned slots therein and a member in said tube ends having portions engaged and welded in the aligned slots in both tube ends.

2. A connection of the kind described embodying therein coacting tubes abutting and welded in end to end engagement and having diametrically opposite, longitudinally extending, aligned slots therein and a plate in said tube ends having portions engaged and welded in the aligned slots in both tube ends.

3. In combination, a strut tube and axle tube disposed at an angle thereto and abutting and welded in end to end engagement therewith, each tube end having oppositely arranged, longitudinally extending slots therein with the slots in one tube end aligned with those in the other tube end, and a plate disposed within said tube ends and having portions engaged and welded in said aligned slots of both tube ends.

4. A connection of the kind described embodying therein coacting tubes abutting and welded in end to end engagement and having diametrically opposite, longitudinally extending, aligned slots therein, and a plate arranged in said tube ends and having portions extending through and beyond the aligned slots in said tube ends and welded thereto.

5. A connection of the kind described embodying therein coacting tubes abutting and welded in end to end engagement and having diametrically opposite, longitudinally extending, aligned slots therein, and a plate arranged in said tube ends and of a depth greater than the diameter of the same and having portions arranged and welded in the aligned slots in both tube ends.

In testimony whereof, I have hereunto set my hand, this 4th day of September, 1930.

KENNETH M. RONAN.